INVENTORS.
GEORGE HORST REINEMUTH
MARK JOSEPH CONNOR
BY
Meyer, Tilberry & Body
ATTORNEYS Nov. 9, 1971     G. H. REINEMUTH ET AL     3,618,433

MACHINING APPARATUS AND SYSTEM

Filed July 2, 1969     4 Sheets-Sheet 3

INVENTORS.
GEORGE HORST REINEMUTH
MARK JOSEPH CONNOR
BY

*Meyer, Tilberry & Body*

ATTORNEYS

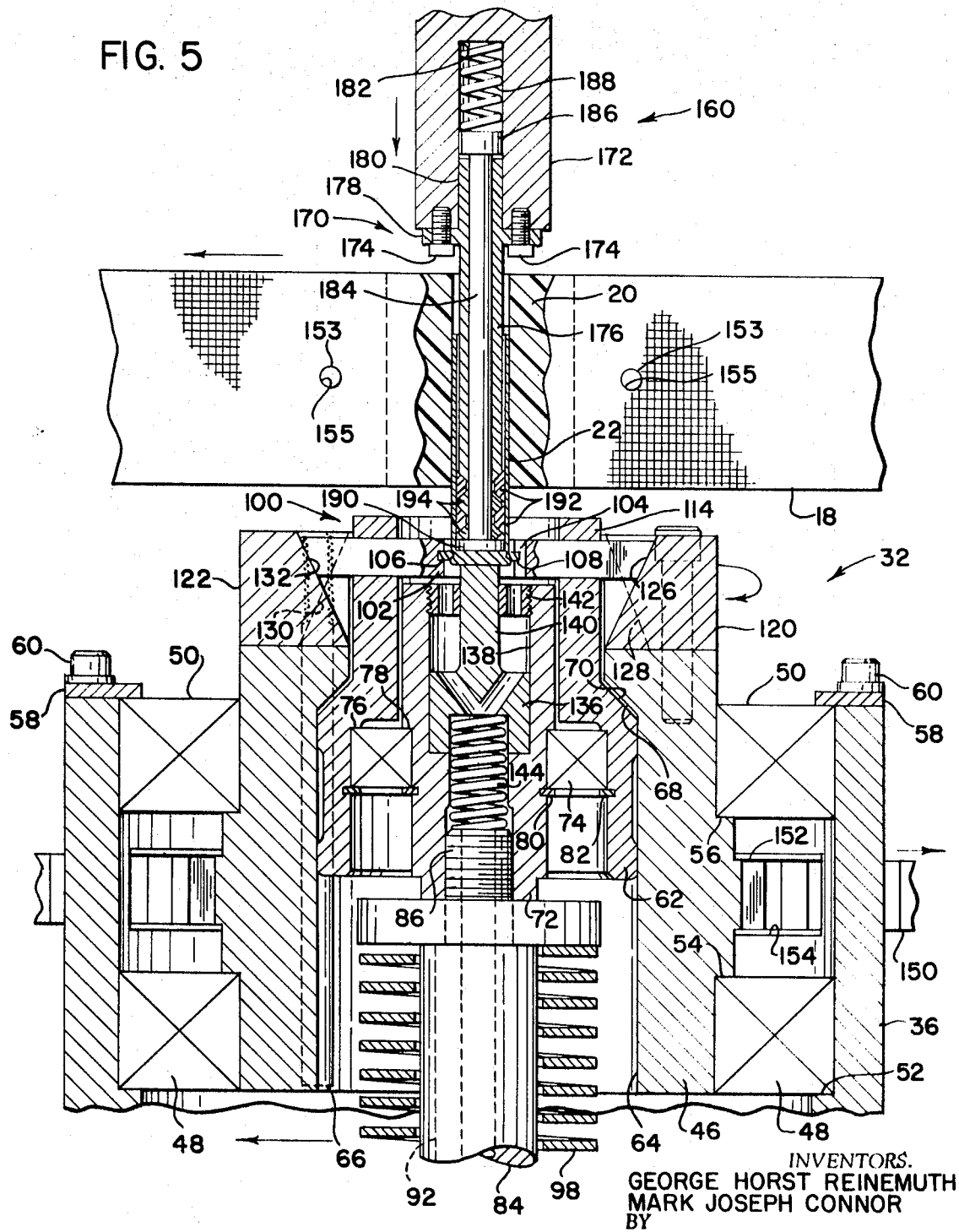

United States Patent Office 3,618,433
Patented Nov. 9, 1971

3,618,433
MACHINING APPARATUS AND SYSTEM
George Horst Reinemuth, Secane, Pa., and Mark Joseph Connor, Wilmington, Del., assignors to Gulf + Western Industrial Products Company, Grand Rapids, Mich.
Filed July 2, 1969, Ser. No. 838,605
Int. Cl. B23b 13/04
U.S. Cl. 82—2.7
14 Claims

ABSTRACT OF THE DISCLOSURE

An apparatus and system particularly suited for machining grooves in the outer surfaces of cylindrical workpieces. The apparatus disclosed includes a rotary turret on which is mounted a plurality of rotary cutting heads. The workpieces are fed to the turret by an endless flexible member provided with workpiece holders at spaced points therealong. The flexible member is trained about the turret at a location above the cutting heads and turret mounted rams function to move the workpieces into and out of the cutting heads during turret rotation.

---

The present invention is directed toward the cutting art and, more particularly, to an apparatus for performing machining operations on the external surfaces of workpieces.

The invention is especially suited for machining extractor grooves in cartridge casings and will be described with particular reference thereto; however, it will be appreciated the invention is capable of broader application and could be used for many similar types of machining operations.

The manufacture of cartridge casings requires a large number of substantially different metal working and treating operations. In the commonly assigned, copending U.S. patent application Ser. No. 689,935 filed Dec. 12, 1967, there is disclosed a casing manufacturing system wherein the casings are processed at an extremely high rate. In the noted system, the processing is basically continuous without the use of batch processing techniques.

In a system of the type described in the aforementioned application, as well as in prior systems, there is need for continuous feed apparatus capable of machining the extractor groove in the casing. Prior machining apparatus, automatic screw type machines, for example, have been somewhat unsatisfactory because of the difficulty of typing them into continuous processing lines. As a result, the extractor groove machining has been done by batch processing.

The present invention provides an apparatus which is especially suited for machining the required grooves at extremely high production rates. Apparatus formed in accordance with the invention can be installed into continuous processing lines with a minimum of alteration. Still further, the apparatus is simple in construction and operation.

In accordance with one aspect of the invention there is provided a machining head assembly which includes a first housing member in which is rotatably mounted a generally cylindrical member having a longitudinal axis. A slideway extends axially through the cylindrical member and a slide member is positioned in the slideway. The slide member is constrained to rotate with the cylindrical while being free to slide axially thereof. Means are provided for mounting a tool carrier in the slide member for movement therewith. The means are arranged to permit the tool carrier to move generally perpendicular to the longitudinal axis during rotation and sliding movement of the slide member. Additionally, cam means are carried by the cylindrical member and rotatable therewith for causing the tool carrier to move generally perpendicular to the axis as the slide member moves axially in the slideway.

In accordance with another aspect of the invention, apparatus is provided for machining circumferential grooves in the outer surface of a generally cylindrical workpiece. The apparatus comprises workpiece holding means for gripping a workpiece and moving it axially along a path between first and second points. A generally cylindrical member is rotatably mounted generally at the second point for movement about the path. A slide member is carried by the cylindrical member for movement along the path and in rotation with the cylindrical member. The slide member has a tool carrier mounted therein for movement in a cutting direction perpendicular to the path. Additionally, cam means are provided between the tool carrier and the cylindrical member for causing the tool carrier to move in a cutting direction during movement of the slide member in a direction toward the second point; and, there are means for moving the slide member in response to movement of a workpiece along the path from the first toward the second point.

In accordance with another aspect of the invention, a system for machining the outer surface of cylindrical workpieces is provided comprising a turret member mounted for rotation about a first axis. A plurality of machining head assemblies are carried by the turret with each of the machining head assemblies including cutting means. Each of the cutting head assemblies are mounted for rotation about separate second axes parallel to the first axis and spaced circumferentially and radially thereof. Workpiece gripping means are aligned with each of said machining head assemblies and are movable along the second axes between first points spaced from said machining head assemblies to second points wherein a workpiece gripped thereby can be machined by the assemblies. Additionally, means function to move the means between the first and second points during rotation of the turret; and feed means operable during rotation of the turret supply workpiece between the gripping means and the machining head assemblies when the gripping means are at the first point.

Accordingly, a primary object of the invention is the provision of a mechanism especially suited for high speed machining of the outer surface of cylindrical workpieces.

Another object is the provision of a system which is particularly suited for machining the extractor grooves in cartridge casings.

A further object is the provision of a system which is capable of machining grooves in small cylindrical workpieces at high production rates.

Yet another object is the provision of a system wherein the outer surfaces of small cylindrical workpieces can be machined while the workpieces are moving at a high velocity and without removing the workpieces from their conveying mechanism.

These and other objects and advantages will become apparent from the following description when read in conjunction with the accompanying drawings wherein.

GENERAL ARRANGEMENT OF DISCLOSED SYSTEM

Figure 1:
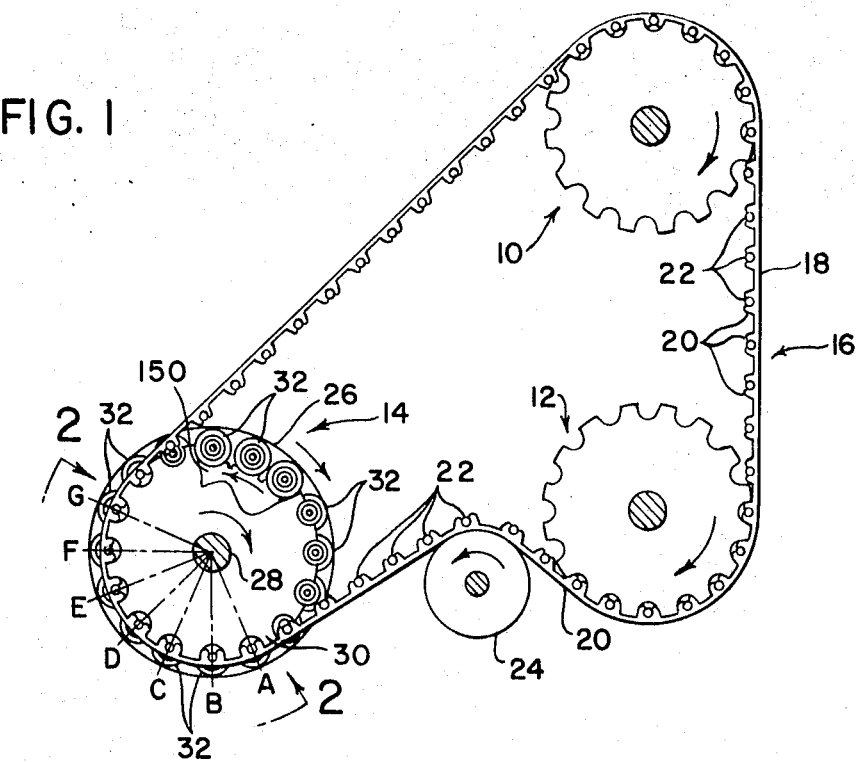
FIG. 1 is a plan view, somewhat diagrammatic, of a cartridge case forming apparatus incorporaitng a machining mechanism formed in accordance with the preferred embodiment of the invention.

Referring more particularly to FIG. 1, there is shown a portion of a cartridge casing processing system. This general type of system is shown in the commonly signed, copending U.S. application S.N. 689,935 filed Dec. 12, 1967, which is incorporated herein reference. According to the noted application, the system utilizes rotary turret type machines which are interconnected by endless flexible conveying members which carry the cartridge cases between various processing steps. In the embodiment described in the aforementioned application the conveying element comprises an endless flexible belt member preferably formed from stainless steel and provided with a multiplicity of closely spaced clip elements formed from plastic or other resilient, wear-resistant material. The clip elements function as the workpiece holders and are sized to resiliently engage the workpieces.

Referring again to FIG. 1, it is seen that the system shown comprises three main rotary turrets 10, 12, and 14. An endless flexible belt member 16 is trained about the three turrets and is arranged to be driven in a clockwise direction by turret rotation. The belt is preferably formed in accordance with the teaching of the aforementioned application and comprises an endless, flexible stainless steel belt member 18 provided with the closely spaced workpiece holding clip members 20. The clips 20 are formed with a generally vertically extending opening sized so as to closely receive and resiliently grip the cartridge casings 22.

In the embodiment under consideration, the turret 12 functions as the feed turret and inserts and partially finished cartridge cases into the clip members 20 on the belt 18. The details of the inserting mechanism forms no part of the persent invention and could, for example, be formed in accordance with the showings of the aforementioned application. After the casings 22 have been inserted into the clips 20, the belt passes over an intermediate idler pulley or sheave 24 and thence to and about the machining turret 14.

The partially finished casings which were inserted into the clips 20 as the belt passed about the turret 12, are oriented with their head end facing vertically downwardly. As the belt passes about turret 14 the necessary extractor groove is machined in the head end of the casing as the casing passes between the points labeled A and G. Thereafter, the machined casings travel to the turret 10 where they are ejected from the belt or transferred to a second belt for conveyance to subsequent processing station, not shown.

MACHINING TURRET, IN GENERAL

In order to permit the casings to be machined at a high rate as the belt is continuously moving, the present invention provides a specially designed cutting assembly. Although, as will become apparent from the description, the cutting assembly could take a variety of forms, the preferred embodiment is as best shown in FIGS. 2 through 5. In particular, as shown, the machining turret 14 comprises a main horizontally positioned turret member 26 which is mounted for free rotation about a vertically extending support shaft 28. A second rotary member 30 is mounted a short distance above member 26 and constrained to rotate simultaneously therewith. The member 30 is provided with spaced recessed portions 32 that receive the clip members 20 as the belt passes thereabout.

MACHINING HEADS 32

Figure 3:
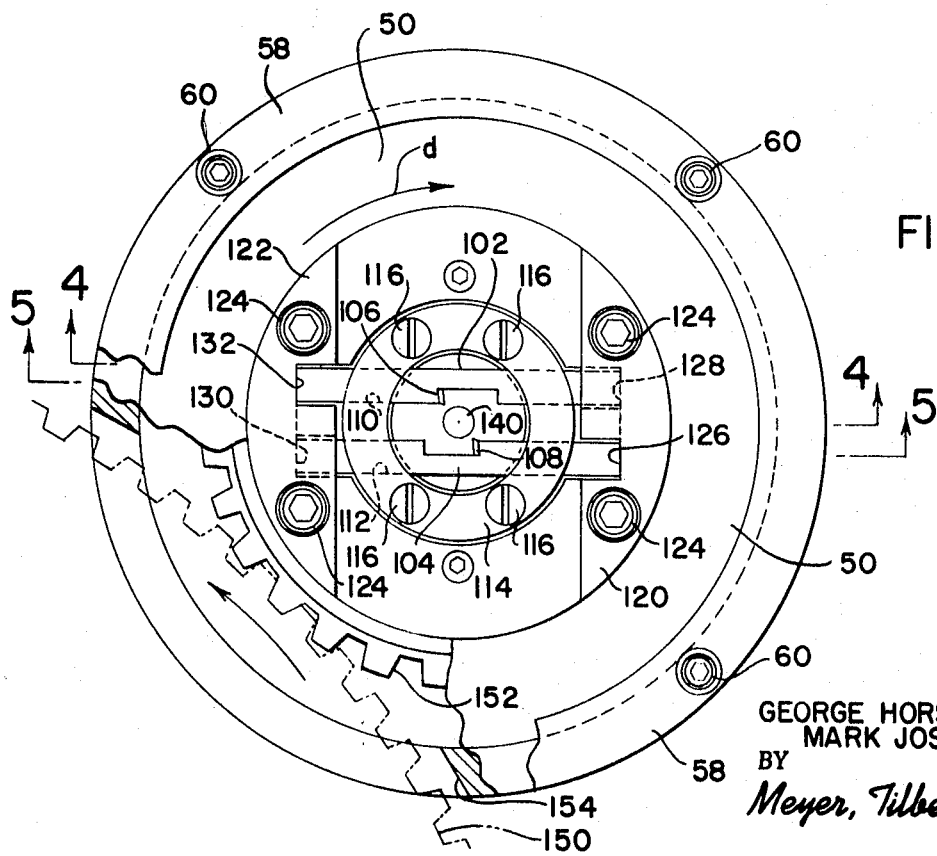
FIG. 3 is a top view of one of the cutting head assemblies shown in FIG. 2.
Figure 4:
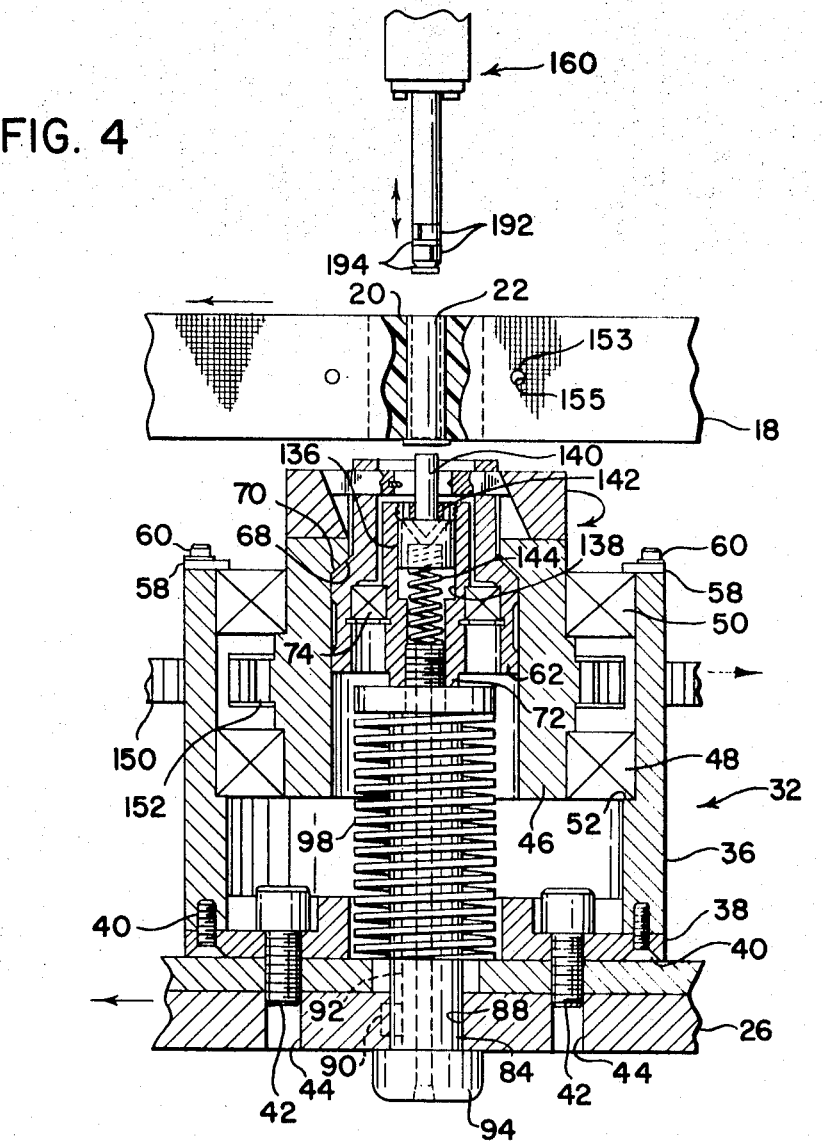
FIG. 4 is a cross-sectional view taken on line 4—4 of FIG. 3 showing the relationship of the various parts prior to start of a cutting operation; and, FIG. 5 is a cross-sectional view taken on line 5—5 of FIG. 3 showing the relationship of the parts near the end of a cutting operation.

Carried from the turret member 26 and arranged circumferentially thereof at spaced locations corresponding to the spacings of the clips 20 on the belt 18, are a plurality of rotary cutting head assemblies 32. Each of the cutting head assemblies 32 are mounted from the turret plate 26 for rotation therewith. Although the cutting head assemblies could have a variety of different configurations, they are preferably all of the same construction and formed as best shown in FIGS. 3 through 5. In particular, each of the cutting head assemblies 32 comprises a generally cylindrical housing or sleeve member 36 which has a lower wall 38 formed integrally therewith or connected thereto in any convenient manner, such as, by the use of machine screws 40. The housing is preferably releasably connected to the turret 26 by socket screws 42 which extend through the lower wall 38 and into tapped openings 44 formed in the turret 26. This allows each of the individual machining heads to be easily and independently removed from the turret 26 for repair or replacement.

Mounted within the housing 32 and freely rotatable relative thereto is a central sleeve member 46. As best shown in FIGS. 4 and 5, the central sleeve member 46 is carried in the outer housing 36 by a pair of bearings 48, 50. As shown, bearing 48 rests on a shoulder 52 formed in the inner wall of housing member 36. A corresponding downwardly facing shoulder 54 is formed on the outer surface of the inner sleeve 46. The shoulder 54 rests against the upper edge of bearing 48 to transmit thrust thereto. The bearing 50 rests against a similar shoulder 56 and is retained in the housing 36 by an annular retainer plate 58 connected to housing 36 by a plurality of socket screws 60.

Positioned within the inner sleeve 46 and arranged for simultaneous rotation therewith is an inner cylindrically shaped member 62. Referring to FIG. 5 it will be noted that the member 62 is closely received in the center bore 64 of member 46. Member 62 is arranged so as to be freely slidable vertically within the central bore 64. A key is formed by a vertically extending shaft 66 which is carried within member 46 and positioned in a vertically extending semi-circular groove. The outer surface of the shaft 66 engages a corresponding semi-circular groove formed in the side of the inner member 62. This key arrangement permits the member 62 to be freely slidable in a vertical direction while assuring that the member rotates with the sleeve 46. It will be noted that the upward extent of movement of member 62 is limited by corresponding shoulders 68, 70 formed on the sleeve member 46 and the inner member 62 respectively.

As best shown in FIGS. 4 and 5, a central spindle member 72 extends axially upwardly through the member 46. The spindle member 72 is connected to the inner member 62 by a bearing 74. As shown, bearing 74 engages downwardly facing shoulders 76, 78 formed on the inner member 62 and the central spindle 72 respectively. The lower end of the bearing 74 is engaged at its inner corner by a snap ring 80 carried in a groove formed in the central spindle 72. In the outer corner of bearing 74 engages a snap ring 82 carried in a groove formed in the inner wall of the inner member 62. This arrangement permits rotation of the inner member 62 relative to the central splindle 72, while assuring that the two members partake of simultaneous vertical movement.

Extending downwardly from the lower end of the central spindle 72 is a large diameter guide shaft 84. As shown, the guide shaft 84 has a reduced diameter upper end 86 which is threadedly received in the lower end of central spindle 72. An outwardly extending collar 87 is received between the enlarged diameter portion of guide shaft 84 and the lower end of central spindle 72. The lower end of guide shaft 84 extends downwardly through an opening 88 formed in the turret member 26. The shaft 84 is freely slidable through the opening 88 but is prevented from rotating relative thereto by a key 90 carried in opening 88 and extending inwardly into a keyway 92 formed in the guide shaft 84. The lower end of the guide shaft 84 has a collar 94 formed thereon to limit the vertical extent of movement of the guide shaft.

The central spindle 72 and the inner member 62 are normally maintained in the upward position shown in FIG. 4 by a relatively heavy compression spring 98 which surrounds the shaft 84 and is received between the top surface of the turret 26 and the lower surface of the collar.

The actual cutting portion of the machining head 32 comprises cutting means 100 carried at the upper end of the central member 62. These cutting means could take a variety of forms; however, in the preferred embodiment they comprise a pair of tool holder elements 102 and 104 each of which carries a respective cutting element 106 and 108. Referring to FIGS. 3 and 5, it will be noted that each of the tool carriers 102 and 104 are carried on the inner member 62 so as to extend chordally thereof equal distances on opposite sides of the vertical center line of member 62. The tool holders 102, 104 are received in respective grooves 110 and 112 formed in the upper end of member 62. The tool holders 102, 104 are freely slidable in a lateral direction relative to the member 62 but are required to partake of all vertical movement of member 62 by an annular retainer plate 114 which is connected to the upper end of member 62 by machine screws 116. Thus, it can be seen that as the inner member 62 moves vertically the tool holders are forced to move simultaneously therewith. Additionally, the tool holders must undergo all rotary motion of the inner member 62.

Referring ot FIG. 3, it is seen that when the tool holders are in the positions shown in FIG. 5, the cutting elements 106, 108 are positioned radially outwardly of the vertical axis of the cutting head.

To explain the operation of the mechanism, assume that a cartridge casing 22 is positioned between the cutters 108 and 106, and coaxial with the axis of the cutting head assembly. Additionally, assume that the cutting head is rotating in the direction shown by the arrow $d$. If the tool holders 102, 104 are then moved respectively to the right and left as viewed in FIG. 3, the cutters will engage the casing to perform the cutting operation thereon. Each of the cutters will, as it passes the casing perform a wiping cut. Many different means could be utlized for causing the required transverse movement of the tool holders. In the preferred embodiment, the means used to provide the necessary movement comprise a pair of camming members 120 and 122 which are connected on diametrically opposite sides of the upper end of the sleeve member 46. The cam members 120, 122 are preferably releasably connected to the sleeve member by socket screws 124. Referring to FIG. 5, it will be noted that the cam member 120 has a pair of oppositely inclined cam surfaces 126 and 128 formed therein. The cam member 122 has a similar pair of cam surfaces 130 and 132 formed directly opposite of the cam surfaces 126, 128. The cams surfaces are formed by milled slots cut into the cam members 120 and 122. As best shown in FIGS. 3 and 5, the cam surfaces 126 and 130 are directly opposite one another and inclined in the same direction. Similarly, the cam surfaces 128, 132 are in directly opposed relationship and similarly inclined in the opposite direction. The opposite ends of the tool holder 104 is provided with a taper corresponding to the taper of the cam surfaces 126, 128 and the opposite ends of the tool holder 102 are similarly provided with a taper corresponding to the taper of the cam surfaces 128, 132.

As can be appreciated, as the central member 62 is moved vertically downward relative to the outer sleeve 46, the tool holder 102, 104 will simultaneously be traversed to the right and left respectively, as viewed in FIG. 3. Although this motion could be produced by power means directly connected to member 62 or the central spindle 72, according to the preferred embodiment the arrangement is such that the downward movement of the sleeve 62 is produced by the inward movement of the cartridge casing to be machined. Referring to FIGS. 3 and 5, it will be been that positioned within the central spindle 72 is a slide member 136. The member 136 is slidably received in an axial bore 138 formed in the central spindle 72. Extending upwardly from the top surface of slide member 136 is a pin or rod portion 140. Rod portion 140 passes through a guide bushing 142 which is threadedly received in the upper end of the central spindle 72. As will be noted, a compression spring 144 is positioned beneath the slide member 136 to maintain it under a upward bias.

OPERATION OF MACHINING HEAD

In operation, the described machining head assembly functions as follows. With the sleeve member 46 rotating and the parts in the position shown in FIG. 4, a cartridge casing is brought into axial alignment with the rotating cutting assembly. The casing is positioned with its head end toward the upwardly extending pin 140, such as shown in FIG. 4. Thereafter, with the casing gripped or held against rotation, downward movement causes it to engage the upper end of the rod 140. Continued downward movement will cause the slide member 136 to move downwardly in the bore 138.

As the lower end of the slide member 136 engages the bottom of the bore 138, the cartridge head is in horizontal alignment with the cutters 106 and 108 at the proper elevation for the machining of the extractor groove. Continued downward movement of the cartridge casing produces a force causing downward movement of the spindle 72 and the inner-sleeve member 62 against the upward bias produced by the spring 98. As the inner sleeve 62 moves downwardly, the tool carriers 102, 104 are moved downwardly therewith and through the interaction of the cam surfaces caused to move transversely of the casing (see FIG. 5). This causes the cutters to engage the casing and cut the required groove therein. Thereafter, the casing is retracted and the upward movement of the spindle 72 and inner-sleeve member 62 to move back to their upper position shown in FIG. 4. The casing can then be removed from the machine head.

MACHINING TURRET AND FEED

Although, the described mechanism can be used separately with many types of feed and transfer mechanisms, according to one aspect of the invention the mechanism is arranged so that the casings can be machined while being maintained within the clips 20 on the belts 18. Referring to FIG. 1, it will be noted that a plurality of the machining heads 32 are carried generally circumferentially of the turret 26 and spaced so that the circumferential distance between the vertical axes of adjacent machining heads corresponds to the spacing of clips 20 on the belt 18. The machining heads 32 are, of course, each driven about their axes during rotation of the turret 26.

The drive mechanism used for rotating the heads could take many forms; however, in the preferred embodiment the means utilized comprised a large diameter gear 150 which is positioned coaxially with the shaft 28. The gear 150 is in engagement with gears 152 (see FIG. 4) carried on the inner-sleeve member 46 of each machining head assembly 32. Referring to FIG. 3, it will be noted that the outer housings 36 of each machining head are provided with an opening 154 through which the gear 150 extends to engage the gears 152.

Depending upon the speed of rotation required for the machining head members about their own center axes, the gear 150 could be stationary or even driven in a direction reverse of the direction of rotation of the turret 26. Alternately, each of the machining heads could be provided with its own indipendent power source, for example, a small air motor built directly into each head.

Figure 2:
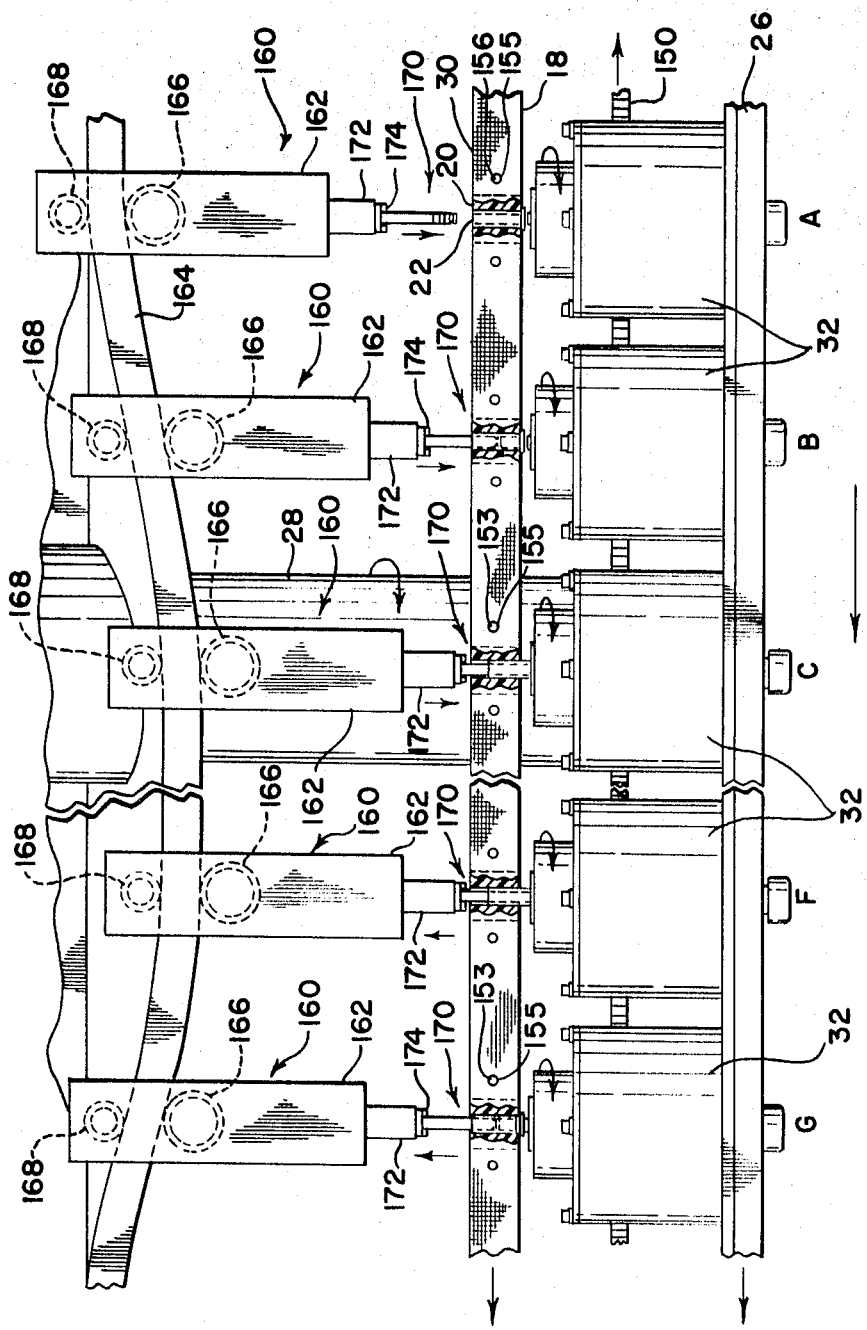
FIG. 2 is a sectional view taken along the line 2—2 of FIG. 1.

Referring to FIG. 2, it will be noted that the feed belt 18 is arranged so that as it passes about the machining turret 14, the cartridge casings carried therein are spaced a short distance above the rod portion 140 of the machining heads 32. Additionally, it will be noted that each of the clips 20 are aligned so that the cartridge casing 22 in each clip is directly in alignment with the subjacent machining head 32. Preferably, alignment and vertical rigidity of the clips is assured by pins 153 which extend outwardly from the turret and through openings 155 in the belt member 16.

Referring again to FIG. 1, means are provided so that as the assembly rotates from position A to position G, the casings are gripped and move downwardly into the respective machining head 32. These means could be conventional reciprocated chucks or similar devices. In the preferred embodiment, the means utilized for engaging the casings and moving them into the machining heads 32 comprised ram assemblies 160. One of the ram assemblies 160 is provided for each of the machining heads 32 on the turret 26. Referring in particular to FIG. 2, it will be noted that one of the ram assemblies 160 is axially aligned with the axis of rotation of each of the heads 32. Specifically, the ram assemblies 160 each comprise a slide member 162 arranged for guided vertical movement in a turret member (not shown) arranged for simultaneous rotation with the turret 26 such as, for example, as shown in the commonly assigned, copending U.S. application S.N. 575,387, filed Aug. 26, 1966. The slide members 162 are constrained to have a desired vertical motion during rotation of the turret by a stationary cam member 164 that is engaged by cam follower rollers 166 and 168 carried on each of the slides 162.

Mounted at the lower end of each of the slide members 162 is a punch or ram assembly 170. The punch assemblies 170 are releasably connected to the lower end portion 172 of each slide 162 in any convenient manner, such as through the use of machine screws 174. This arrangement permits individual punch assemblies to be removed for repair or replacement. Referring to FIG. 5, the details of each of the punch assemblies 170 can be seen. It will be noted that each assembly 170 comprises a first sleeve-like member 176 having an outwardly extending annularly flange 178. The upwardly extending portion 180 of each sleeve 176 extends into a bore 182 formed in portion 172 of slide 162. A central rod member 184 which terminates in an enlarged upper end portion 186 is slidably received in the sleeve 176. A compression spring 188 acts against the upper surface of the enlarged portion 186 to bias the rod 184 in a downward direction. The lower end of the rod 184 is provided with an enlarged flange portion 190 which is perferably releasably connected to rod 184. The diameter of the flange portion 190 is such that it can be freely received within the cartridge casing 22. Positioned about the center rod 184 and between the flange 190 and the lower end of the sleeve member 176, are a plurality of ring members 192 and 194. The ring members 192, 194 are slidable longitudinally of the rod 184. Additionally, the two rings 192 are split, that is, they have a gap 193 which extends radially through them (see FIG. 4).

When the ram assembly is in the upper position shown in the FIG. 4, the rod member 184 is biased downwardly so that the lower surface of the enlarged portion 186 engages the upper end of the sleeve portion 180. In this position the distance between the flange 190 and the end of the sleeve 176 is of such that the rings 192 can contract so that their outer surface is generally continuous with the outer surface of the sleeve member 184 as shown in FIG. 4. They are sized so that in the contracted position, their diameter is slightly less than the internal diameter of the cartridge casings. When a force is applied to the lower surface of the flange 190, the rod 184 is moved upwardy against the bias of spring 188. The upward movement of the rod causes the cooperating surfaces on members 192, 194 to expand the split rings 192 radially outwardly. This causes the rings 192 to engage the cartridge casing and grip it against rotation, with the frictional forces between the rings and the sleeve 176 preventing rotation relative thereto.

OPERATION OF SYSTEM

Referring to FIGS. 2 and 5, the operation of the overall system will be explained.

Note that as a machining head assembly reaches position A in FIG. 1, the corresponding ram is spaced above the belt a short distance. At this time the ram is, of course, in a contracted position. As the turret rotates from position A to B, the cam 164 causes the ram to be moved downwardly and the punch assembly 170 to enter the cartridge casing in the clip aligned therewith. The continued rotation of the turret 26 to position C causes continued downward movement of the ram until the lower end of flange 190 engages the inner head end of the cartridge casing. Further downward movement of the ram moves the casing downwardly in its clip until the lower end of the casing engages the top surface of the upwardly extending pin 140 of the subjacent machining head 32. As the turret 26 continues to rotate from positions B through F, the pin member 140 is moved downwardly until its lower surface engages the bottom of the bore 138. Thereafter, continued downward movement is effected against the large biasing spring 98 which causes the rod 84 to be moved upwardly against the bias of the spring 182. This causes the split rings 92 to be expanded outwardly firmly gripping the interior surface of the cartridge casing 22 to prevent any rotation of the cartridge casing about the ram assembly 170. Continued downward movement of the ram moves the inner sleeve 62 of the machining head 32 downwardly thereby moving the tool holders 102, 104 transversely to cause the cutting tools 106, 108 to be moved into the casing to machine the required groove. Thereafter, as the turret 26 moves from positions F through G the ram assembly 160 is moved upwardly until a short distance past position G it is completely free of the casing and spaced thereabove. As the ram moves back up, the bias of springs 98 and 144 causes the pin 140 to push the casing 22 back up nearly into its original position in the clip 20. Thereafter, the machined casings are moved to the mechanism 10 where they are extracted from the belt. Alternatively, the casings can be conveyed in the same belt directly to further processing stations such as, for example, annealing or cleaning operations.

As can be appreciated, the described arrangement permits the casings to be machined at an extremely high rate. Note that the casings are gripped by the handling mechanisms throughout the machining operation. Thus, the entire operation takes place without the necessity of intermediate handling mechanisms or separate feed and discharge mechanisms. Further, this allows the machining to be directly tied into a continuous processing line of the type shown in the commonly assigned, copending U.S. application Ser. No. 689,935 filed Dec. 12, 1967.

The invention has been described in great detail sufficient to enable anyone of ordinary skill in the art to make and use the same. Obviously, modifications and alterations of the preferred embodiment will occur to others upon a reading and understanding of the specification and it is our intention to include all such modifications and alterations as part of our invention insofar as they come within the scope of the appended claims.

Having thus described my invention, we claim:

1. Apparatus for machining circumferential grooves in the outer surface of a generally cylindrical workpiece, said apparatus comprising:

workpiece holding means for gripping a workpiece and moving it axially along a path between first and second points,
a generally cylindrical member rotatably mounted generally at said second point for movement about said path,
a slide member carried by said cylindrical member for movement along said path and rotation with said cylindrical member said slide member having a tool carrier mounted therein for movement in a cutting direction perpendicular to said path;
cam means between said tool carrier and said cylindrical member for causing said tool carrier to move in a cutting direction during movement of said slide member in a direction toward said second point, and
means moving said slide member in response to movement of a workpiece along said path from said first toward said second point.

2. Apparatus for machining circumferential grooves in the outer surface of a generally cylindrical workpiece, said apparatus comprising:
workpiece holding means for gripping a workpiece and moving it axially along a path between first and second points,
a generally cylindrical member rotatably mounted generally at said second point for movement about said path,
a slide member carried by said cylindrical member for movement along said path and rotation with said cylindrical member, said slide member having a tool carrier mounted therein for movement in a cutting direction perpendicular to said path,
cam means between said tool carrier and said cylindrical member for causing said tool carrier to move in a cutting direction during movement of said slide member in a direction toward said second point,
means moving said slide member in response to movement of a workpiece along said path from said first toward said second point, and
means for maintaining said slide member biased towards said first point.

3. Apparatus for machining circumferential grooves in the outer surface of a generally cylindrical workpiece, said apparatus comprising:
workpiece holding means for gripping a workpiece and moving it axially along a path between first and second points,
a generally cylindrical member rotatably mounted generally at said second point for movement about said path,
a slide member carried by said cylindrical member for movement along said path and rotation with said cylindrical member, said slide member having a tool carrier mounted for movement in a cutting direction perpendicular to said path,
cam means between said tool carrier and said cylindrical member for causing said tool carrier to move in a cutting direction during movement of said slide member in a direction toward said second point, and
means moving said slide member in response to movement of a workpiece along said path from said first toward said second point,
said means for moving said slide member in response to movement of a workpiece along said path from said first toward said second point comprising a rod member mounted centrally of said slide member and extending toward said first point for engagement by a workpiece.

4. The apparatus as defined in claim 3 including means for biasing said rod member in a direction toward said first point.

5. The apparatus as defined in claim 4 wherein said rod member is carried in a spindle member which extends into said cylindrical member, said spindle member being maintained under a bias toward said first point.

6. Apparatus for machining the outer surface of cylindrical workpieces comprising:
a turret member mounted for rotation about a first axis;
a plurality of machining head assemblies carried by said turret, each of said machining head assemblies including cutting means each mounted for rotation about separate second axes parallel to said first axis and spaced circumferentially and radially thereof;
workpiece gripping means aligned with each of said machining head assemblies and movable along said second axes between first points spaced from said machining head assemblies to a second point wherein a workpiece gripped thereby can be machined by said assemblies;
means for moving said gripping means between said first and second points during rotation of said turret; and
feed means operable during rotation of said turret for supplying workpieces between said gripping means and said machining head assemblies when said gripping means are at said first point.

7. Apparatus for machining the outer surface of cylindrical workpieces comprising:
a turret member mounted for rotation about a first axis;
a plurality of machining head assemblies carried by said turret member, each of said machining head assemblies including cutting means each mounted for rotation about separate second axes parallel to said first axis and spaced circumferentially and radially thereof;
workpiece gripping means aligned with each of said machining head assemblies and movable along said second axes between first points spaced from said machining head assemblies to a second point wherein a workpiece gripped thereby can be machined by said assemblies;
means for moving said gripping means between said first and second points during rotation of said turret member; and
feed means operable during rotation of said turret member for supplying workpieces between said gripping means and said machining head assemblies when said gripping means are at said first point;
said feed means comprising an endless flexible member having workpiece holding means carried thereon, said flexible member being guided about said turret member.

8. The apparatus as defined in claim 6 wherein said workpiece gripping means comprise reciprocated ram members.

9. Apparatus for machining the outer surface of cylindrical workpieces comprising:
a turret member mounted for rotation about a first axis;
a plurality of machining head assemblies carried by said turret member, each of said machining head assemblies including cutting means each mounted for rotation about separate second axes parallel to said first axis and spaced circumferentially and radially thereof;
workpiece gripping means aligned with each of said machining head assemblies and movable along said second axes between first points spaced from said machining head assemblies to a second point wherein a workpiece gripped thereby can be machined by said assemblies;
means for moving said gripping means between said first and second points during rotation of said turret;
feed means operable during rotation of said turret for supplying workpieces between said gripping means and said machining head assemblies when said gripping means are at said first point;
said feed means comprising an endless flexible belt member having workpiece holding clips carried thereon at least at spaced locations corresponding to the circumferential spacings of said machining head assemblies on said turret member; and guide means for guiding said belt member about said turret member during rotation thereof to align said workpiece holding clips with said machining head assemblies.

10. The apparatus as defined in claim 9 wherein said gripping means comprise ram members for moving workpieces in said clips toward said machining head assemblies.

11. The apparatus as defined in claim 10 wherein machining head assemblies include biasing means adapted to move workpieces upwardly in said clips following a machining operation.

12. Apparatus for machining the outer surface of cylindrical workpieces comprising:
- a turret member mounted for rotation about a first axis;
- a plurality of machining head assemblies carried by said turret member, each of said machining head assemblies including cutting means each mounted for rotation about separate second axes parallel to said first axis and spaced circumferentially and radially thereof;
- workpiece gripping means aligned with each of siad machining head assemblies and movable along said said second axes between first points spaced from said machining head assemblies to a second point wherein a workpieces gripped thereby can be machined by said assemblies;
- means for moving said gripping means between said first and second points during rotation of said turret member; and
- feed means operable during rotation of said turret member for supplying workpieces between said gripping means and said machining head assemblies when said gripping means are at said first point;
- said workpiece gripping means comprising expandable rams.

13. Apparatus for machining the outer surface of cylindrical workpieces comprising:
- a turret member mounted for rotation about a first axis;
- a plurality of machining head assemblies carried by said turret member, each of said machining head assemblies including cutting means each mounted for rotation about separate second axes parallel to said first axis and spaced circumferentially and radially thereof;
- workpiece gripping means aligned with each of said machining head assemblies and movable along said second axes between first points spaced from said machining head assemblies to a second point wherein a workpiece gripped thereby can be machined by said assemblies;
- means for moving said gripping means between said first and second points during rotation of said turret member;
- feed means operable during rotation of said turret member for supplying workpieces between said gripping means and said machining head assemblies when said gripping means are at said first point; and
- means for producing rotation of said machining head assemblies.

14. Apparatus for machining extractor grooves in the head ends of cartridge casings comprising:
- an endless flexible member having casing gripping means at spaced positions therealong,
- said gripping means having casing receiving openings extending therethrough for resiliently engaging the outer surface of the casings;
- a rotatable turret member with which said endless flexible member is engaged for traveling over at least a portion of the outer periphery of said turret member during rotation thereof;
- means for positioning said gripping means on said turret member as said flexible member travels thereover;
- rotatable groove cutting means carried by said turret, and
- ram means carried by said turret for moving said casings in said gripping means to locations where they can be engaged by said groove cutting means.

References Cited

UNITED STATES PATENTS

| | | | |
|---|---|---|---|
| 1,967,153 | 7/1934 | McCreary | 82—70 X |
| 2,388,355 | 11/1945 | Fether | 82—2.7 |
| 2,606,359 | 8/1952 | Stadthaus | 82—2.7 X |
| 3,400,620 | 9/1968 | Armbruster et al. | 82—85 X |
| 3,481,232 | 12/1969 | Yann | 82—85 X |

LEONIDAS VLACHOS, Primary Examiner

U.S. Cl. X.R.

82—2 E, 3